United States Patent [19]

Stenzel

[11] 4,287,063

[45] Sep. 1, 1981

[54] APPARATUS FOR SEPARATING LIQUIDS

[75] Inventor: Wallace I. Stenzel, Thiensville, Wis.

[73] Assignee: Waukee Engineering Company Inc., Milwaukee, Wis.

[21] Appl. No.: 88,832

[22] Filed: Oct. 29, 1979

[51] Int. Cl.³ ............................................. B01D 33/06
[52] U.S. Cl. .................................. 210/402; 210/407; 210/416.5; 210/924
[58] Field of Search ............... 210/242, 402, DIG. 25, 210/391, 410, 416

[56] References Cited

U.S. PATENT DOCUMENTS

| | | | |
|---|---|---|---|
| 1,860,819 | 5/1932 | Schomberger | 210/DIG. 25 |
| 2,710,099 | 6/1955 | Kalinske | 210/410 |
| 3,693,805 | 9/1972 | Tillett et al. | 210/DIG. 25 |
| 3,702,297 | 5/1975 | Matsim | 210/242 |
| 3,830,658 | 8/1974 | Damster | 210/391 |
| 3,890,234 | 6/1975 | Galicia | 210/242 |
| 4,061,569 | 12/1977 | Bennett | 210/DIG. 25 |

*Primary Examiner*—Theodore A. Granger
*Attorney, Agent, or Firm*—Andrus, Sceales, Starke & Sawall

[57] ABSTRACT

An improved apparatus for separating liquids and particularly separating oil from the surface of water contained in a tank. The apparatus includes a partially submerged drum mounted to rotate in the water tank and a film of oil and water is picked up on the surface of the rotating drum and removed by a doctor blade. The removed oil and water mixture flows through a trough and is discharged into the upper end portion of a vertical tube. The lower open end of the tube is located beneath the level of the water and the tube has an overflow outlet located at a higher level than the level of the water. The oil, having a lesser density than the water, will collect in the upper end in the tube and the level of oil will rise and is discharged through the overflow outlet, thereby providing a full separation of the oil from the water. To periodically clean oil sludge from the doctor blade and trough, an air operated aspirating unit is utilized to draw water from the tank and discharge the water in the form of a jet along the doctor blade and within the trough.

1 Claim, 5 Drawing Figures

APPARATUS FOR SEPARATING LIQUIDS

BACKGROUND OF THE INVENTION

Because of the problems of environmental pollution, there has been increased interest in the separation of oil from bodies of water. Oil slicks on oceans and lakes caused by leakage from tankers, drilling rigs, and storage tanks, has caused serious pollution of beaches and injury to wildlife. Similarly, oil-water mixtures resulting from industrial activities has produced serious pollution problems when discharged into rivers, streams and other bodies of water.

As an example, many machine parts or heat treated parts are washed in wash tanks, and the wash water is contaminated with machine oil and heat treating oil. In the past the contaminated wash water has been discharged into the sewage system, but because of the pollution problem this practice has been discontinued with the result that it is frequently necessary to haul the oil-contaminated wash water away to disposal sites or for further separation treatment.

In an attempt to separate oil from wash water, or other bodies of water, partially submerged float tubes, belts and discs have been utilized which rotate or travel in the wash water and pick up a film of water-oil mixture and the film is subsequently removed from the moving element. Devices of this type have a low efficiency of separation, meaning that it is not possible to remove all of the oil from the body of water, and the removed oil contains a substantial proportion of water. In addition, separating devices, as used in the past, have generally had a low capacity resulting in the removal of only small amounts of oil in a given period of time.

The patent to Maksim U.S. Pat. No. 3,702,297, discloses an oil skimming device in which a drum is partially submerged in the body of water and, on rotation, serves to pick up a film of oil and water which is removed from the surface of the drum by a doctor blade. With the device as shown in the Maksim patent, the oil-water mixture is delivered to a receptacle and the oil separates from the water so that an increasingly deeper layer of oil accumulates in the receptacle and the water is displaced from the bottom of the receptacle. When the oil-water interface descends to a set level, a pump is operated to withdraw the oil from the container and water flows back into the receptacle to replace the oil.

SUMMARY OF THE INVENTION

The invention relates to an improved apparatus for separating liquids and particularly for separating oil from a body of water, such as wash water. In accordance with the invention, a movable mechanical member, such as a drum, is partially submerged in the body of water in the wash tank and as the drum rotates a film of oil and water is picked up on the drum surface and removed by a doctor blade. The mixture of oil and water runs off the doctor blade into an inclined trough and is discharged from the lower end of the trough into the upper end portion of a vertical tube. The lower end of the tube is open and is located beneath the level of the wash water in the tank, while the upper end of the tube is open to the atmosphere and is located above the level of the water in the tank.

The oil in the oil-water mixture flowing into the tube has a lesser density than the water and will collect in the upper end of the tube, and the level of oil in the tube will gradually rise as more and more oil-water mixture flows into the tube to a location where the oil is discharged through an overflow outlet, thereby providing a full separation of the oil and water.

As the oil skimming device normally runs continuously, oil sludge may tend to accumulate on the doctor blade and within the trough. In the past, it has been necessary to periodically shut down the device to remove the sludge accumulation. With the device of the invention, an automatic cleaning system is utilized which periodically flushes the sludge and other foreign material from the doctor blade and trough.

More specifically, an air actuated aspirating unit is utilized in which air under pressure is passed through a venturi and the pressure differential at the venturi throat will act to draw water upwardly through a tube from the water tank. The air-water mixture is discharged through separate jets, one of which is directed against the operating surface of the doctor blade, while the second jet is directed along the bottom surface of the trough. The high velocity fluid will act to remove the sludge and other foreign material from the surface of the doctor blade, as well as from the bottom of the trough, thereby preventing a build-up of sludge and downtime of the machine.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

The drawings illustrate an apparatus for separating liquids of different densities and particularly for separating oil from a body of water. The apparatus is illustrated as being associated with a wash tank 1 which is of a conventional type and is used for washing machined metal parts or heat treated metal parts. However, it is contemplated that the separating apparatus can be utilized in various applications where it is desired to separate oil from a body of water.

Figure 1:
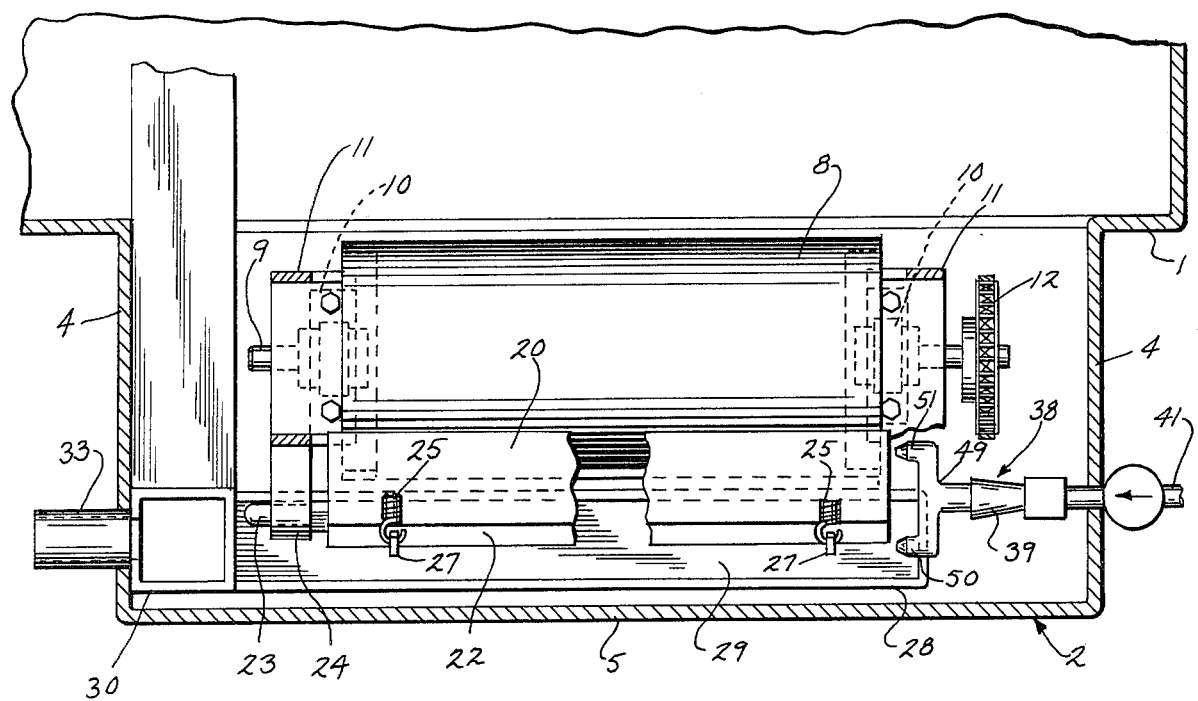
FIG. 1 is a horizontal section of the apparatus of the invention as associated with a wash tank.

The separating apparatus which is attached to the wash tank 1 includes a housing 2 composed of a top wall 3, a pair of side walls 4, a rear wall 5 and a diagonal bottom wall 6 which is connected between the lower edge of the rear wall and the side walls 4. As shown in FIG. 1, the housing 2 is attached to the upper portion of the wash tank, so that the wash water, with the water level indicated at 7, is located in the housing.

Mounted for rotation in the upper end of the housing 2 is a generally cylindrical drum 8 and the shaft 9 of the drum is journalled within bearings 10 which are supported through brackets 11 from the top wall 3 of the housing.

To rotate the drum, one end of the shaft 9 carries a sprocket 12 which is connected by a chain 13 to a sprocket 14 mounted on the shaft 15 of a gear transmission 16. The gear transmission 16 is driven by a motor 17 which is mounted on the transmission.

The transmission 16 is mounted on a plate 18 which is secured across an opening in the top wall 3 of housing 2 by a series of clamps 19. As the brackets 11 are connected to the plate 18, removal of the plate by disengagement of clamps 19 will enable the entire drive unit, including the motor 17, transmission 16 and drum 8 to be removed from the housing 2 for maintenance or cleaning.

As best illustrated in FIG. 1, the lower portion of drum 8 is located beneath the water level line 7 and as the drum rotates a film or coating of a water-oil mixture is picked up on the surface of the drum. The film is removed from the drum surface by means of a doctor blade 20 having a sharpened edge which rides on the drum surface.

As shown in FIG. 1, the rear edge of the blade 20 is mounted on a blade support 21 which is welded to a tube 22. Shaft 33 extends within the tube 22 and within openings in arms 24, which are located at either end of the drum 8. Arms 24 are connected to the bearing brackets 11.

To bias the blade 20 against the drum surface, a series of spring 25 are utilized. One end of each spring is connected to a lug 26 attached to the plate 18, while the lower end of each spring is attached to a lug 27 which extends upwardly from the rear end of the blade support 21. With this construction, the force of the springs 25 acts to urge the blade 20 downwardly, as viewed in FIG. 3, and bias the blade against the drum surface. As the drum 8 rotates, the film of oil and water on the drum surface will be removed from the drum by the blade 20 and the mixture will flow downwardly along the blade 20 and blade support 21 and is discharged into an open top trough 28.

Trough 28 has a length slightly greater than the length of the drum 8 and is provided with an inclined bottom surface 29 which slopes downwardly toward a tube 30, which is secured to one of the side walls 4 of the housing 2. The end of the trough 28 is mounted with an opening in the upper end portion of the tube 30 so that the oil and water mixture will flow along the surface 29 and be discharged into the tube.

Figure 2:
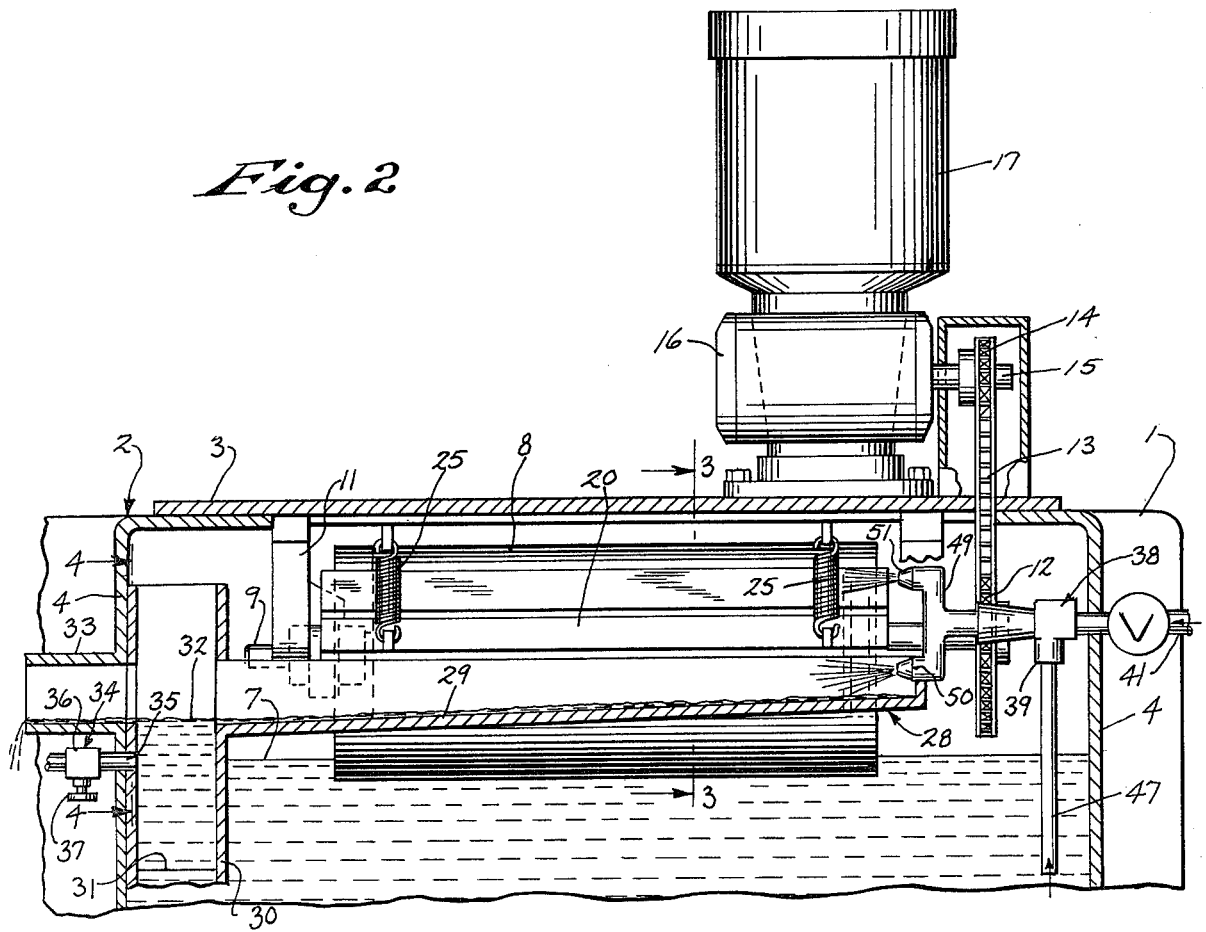
FIG. 2 is a section taken along line 2—2 of FIG. 1.

As shown in FIG. 2, the tube is generally rectangular in cross section although the shape of the tube is not critical to the invention. The upper end of the tube 30 is open to the atmosphere and the tube, as shown in FIG. 1, is located at an acute angle to the vertical and extends downwardly from the housing 2 into the wash tank 1, with the lower open end of the tube being beneath the water level 7.

As the oil and water mixture flows along the trough 28, the water being heavier will hug the surface 29 and will fall downwardly into the tube 30. The oil being lighter will collect in the upper end of the tube 30 and as the oil accumulates in the tube, the oil-water interface, indicated by 31, will gradually descend within the tube. This is due to the fact that the oil is of lesser density than the water, and the displacement of a portion of the water within the tube by the oil will require a column of oil of greater height to balance the displaced water with the result that the upper level of the oil in the tube 30, indicated by 32, will progressively rise.

The upper end of the tube 30 is provided with an overflow outlet 33 and as the level 32 of the oil rises, it eventually will reach the lower extremity of the overflow outlet 33 and be discharged from the tube.

Once the oil is discharged from the overflow outlet 33 the oil-water interface 31 will remain at the same level for the remainder of the operation.

After all of the oil has been removed from the water in the wash tank, the coating or film picked up by the drum 8 will be composed entirely of water, with the result that the pure water will flow through the trough and be discharged into the tube 30. The water entering the tube 30 will merely flow downwardly to a level beneath the oil-water interface 31 and be discharged back through the lower end of the tube into the wash tank. Thus, the column of oil in the tube 30 extending between the interface 31 and the upper level 32 will remain in the tube.

Figure 3:
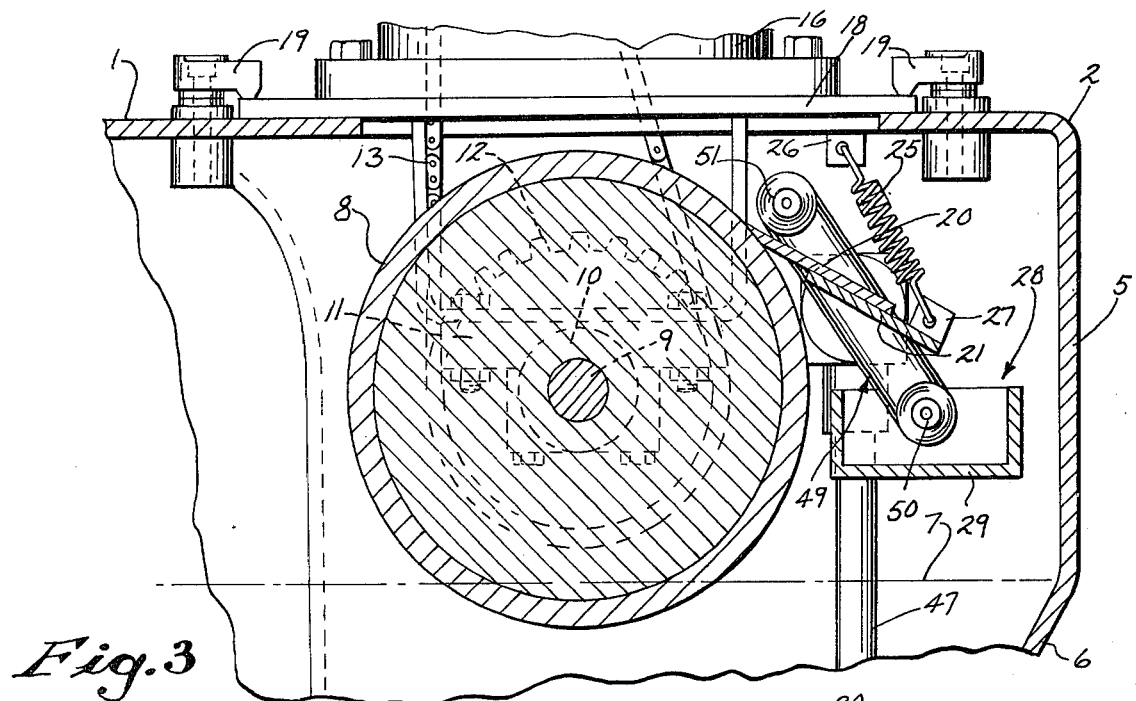
FIG. 3 is a section taken along line 3—3 of FIG. 1.
Figure 4:
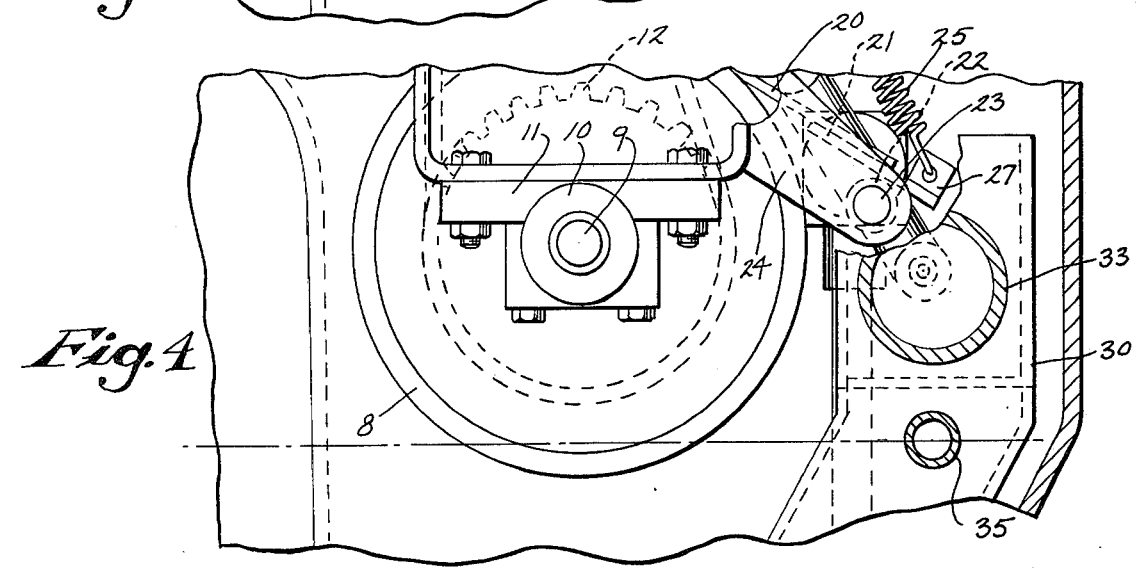
FIG. 4 is a section taken along line 4—4 of FIG. 1.
Figure 5:
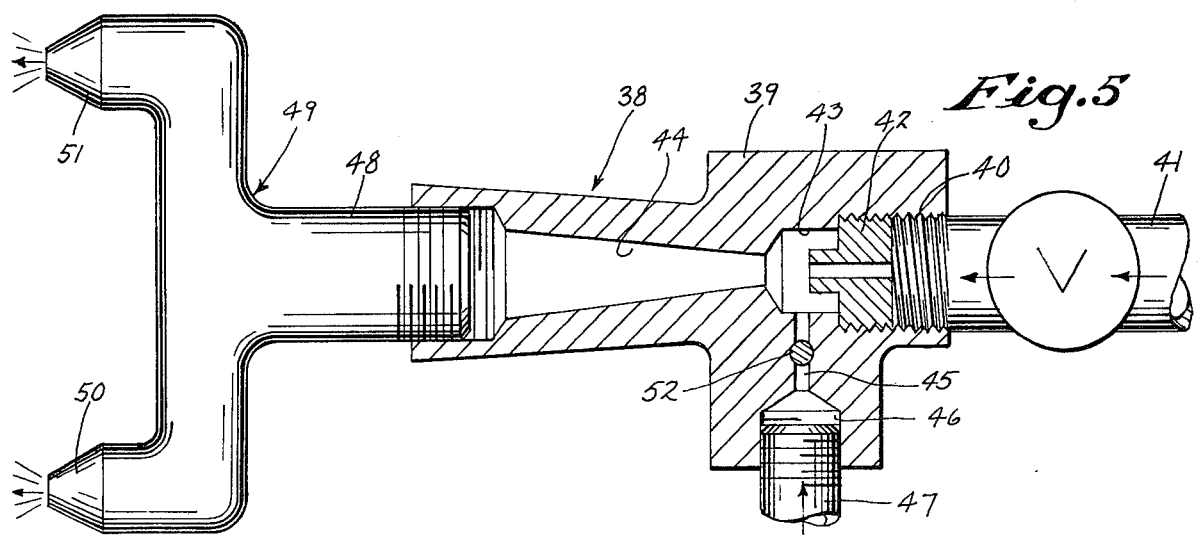
FIG. 5 is an enlarged vertical section showing the aspirating unit.

If it is desired to remove the remaining slug of oil located between level 32 and interface 31 in tube 30, a valve-controlled outlet mechanism, indicated generally by 34, can be incorporated. As shown in FIG. 3, the outlet mechanism 34 includes a pipe 35 connected to the tube 30 at a position corresponding to the liquid level 7. Flow through pipe 35 is controlled by a valve 36 having a manually operated valve stem 37. If it is desired to remove the slug of oil in tube 30 after operation of the apparatus, the valve 36 is opened causing the oil in the space between the levels 32 and 7 to start to flow from the pipe 35. Simultaneously, the interface level 31 will rise to balance the decreased head of oil. This action continues with the oil level 32 receding and the interface 31 rising until both levels coincide with level 7, thereby resulting in the complete removal of oil from the tube 30.

Alternately, the slug of oil in tube 30 can be removed by a pump or syphon.

The oil skimming device of the invention is normally operated continuously and after an extended period of service, oil sludge and other foreign material may tend to accumulate on the upper surface of the doctor blade, as well as in the bottom of the trough. The invention includes an automatic flushing system which periodically flushes the sludge and other foreign materials from both the doctor blade and the trough. In this regard, an air actuated aspirating unit 38 is utilized which includes a housing or body 39. The body 39 is provided with a threaded inlet opening 40 which received an air line 41 that is connected to a source of air or other gas under pressure. Threaded within the inner portion of the opening 40, is a nipple 42 having an axial opening which communicates with a central chamber 43 in the body 39. Extending outwardly from the central chamber 43 is a tapered or diverging passage 44. The opening in the nipple 42 defines an inlet section of a venturi, the tapered outer passage 44 defines an outlet section, while the chamber 43 constitutes a throat portion.

Extending downwardly from the chamber 43 is a passage 45, which flares outwardly into an enlarged opening 46 that receives a dip tube 47. The lower end of tube 47 extends a substantial distance beneath the level of water in the tank.

The stem 48 of a T-shaped outlet conduit 49 is threaded within the outer end of the body, and the legs of the outlet conduit are provided with discharge jets or nozzles 50 and 51. The lower nozzle 50 is located at the end of the trough 28 as shown in FIG. 3, while the upper nozzle 51 is located adjacent the side edge of the doctor blade 20.

A conical tipped set screw 52 is threaded within an opening that intersects the passage 45, and adjustment of the screw 52 regulates the flow of water which is drawn upwardly through the tube 47 from the tank 4.

In operation, air under pressure is supplied to the venturi through line 41 and the increased velocity of the air passing through the inlet section of the venturi causes a pressure differential which draws water from tank 14 through the tube 47 into the throat of the venturi. The mixture of air and water is then discharged from the nozzles 50 and 51 along the bottom surface of the trough 28 and along the surface of the doctor blade 20 to remove the accumulation of sludge and foreign material. As best illustrated schematically in FIG. 3, a solenoid valve 53 is connected in the air line and can be connected in electrical circuit with a timer. With this construction, the timer will periodically open the valve 53 to admit air into the line 41 to flush the surfaces of the trough and the doctor blade. The use of the cleaning system substantially reduces downtime and maintenance costs for operation of the oil skimmer.

The separating apparatus provides a substantially 100% separation of oil and water, so that the oil being discharged from the overflow 33 contains no visible amount of water and can be returned to a storage site for re-use. Similarly, the water being discharged through the tube 30 back to the wash tank 1 contains no oil. Thus, the apparatus provides a complete separation of the oil and water with the water being returned to the wash tank for reuse and the oil being collected for subsequent storage and possible reuse.

The separation apparatus of the invention provides a high rate or capacity of removal of oil from the water with the particular rate of removal depending primarily on the viscosity of the oil, which in turn is dependent on the temperature of the wash water and oil. With high temperature wash water of approximately 180° F., a thinner film of oil and water will adhere to the drum 8, while if the temperature of the water is lower, the film adhering to the drum will be thicker and the rate of removal of oil from the wash water will be correspondingly greater.

While the drawings illustrate the use of a drum 8 to pick up the film of water and oil from the wash tank, it is contemplated that other mechanisms, such as a belt or disc can be utilized. Similarly, while the apparatus has been shown as associated with an industrial wash tank for separating surface oil from water, the apparatus can be used for separating any two liquids having different densities in industrial, laboratory, residential or environmental applications.

While the above description has described a cleaning mechanism in which pressurized air is utilized to create an aspirating affect and draw water from tank 6, it is contemplated that line 41 can be connected directly to an outside source of liquid, such as water, so that the water from the outside source is discharged through jets 50 and 51 rather than employing the pressurized air to draw water from tank 6.

Various modes of carrying out the invention are contemplated as being within the scope of the following claims particularly pointing out and distinctly claiming the subject matter which is regarded as the invention.

We claim:

1. An apparatus for separating oil from water, comprising a vessel to contain a body of water, a drum partially submerged in the water and having an outer surface to which a film of a mixture of water and oil adheres during rotation of said drum, a doctor blade to rotate against the outer surface of the drum and remove the mixture from said surface, an inclined trough disposed adjacent the periphery of the drum to receive said mixture from the doctor blade, a conduit located adjacent the low end of the trough and having an upper end disposed above the level of water in the vessel and having an open lower end located beneath the level of water in the vessel, said mixture of water and oil flowing by gravity along the lower surface of the trough into said conduit and said water flowing downwardly through said conduit and being discharged from the lower open end of the conduit into said body of water, said oil collecting as a layer in the upper end portion of the conduit, means for removing the collected oil layer from the conduit, and cleaning means comprising an aspirating unit having an inlet section connected to a source of gas under pressure and having an outlet section and having a throat portion disposed between said inlet and outlet portions, a tube having its upper end communicating with said throat portion and having its lower end extending to a level beneath the level of the body of water whereby air flowing through said aspirating unit will draw water into said throat portion to mix with the gas and the mixture of gas and water will be discharged from said outlet section, and a pair of discharge nozzles communicating with said outlet section, one of said outlet nozzles disposed to discharge said mixture along the bottom surface of said trough for delivery to said conduit and the other of said nozzles disposed to distribute said mixture along a surface of said doctor blade to thereby clean foreign material from said blade.

* * * * *